(12) United States Patent (10) Patent No.: US 12,574,223 B1

Stapleton (45) Date of Patent: Mar. 10, 2026

(54) QUANTUM DERIVED UNIQUE KEY PER TRANSACTION

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 256 days.

(21) Appl. No.: 18/100,920

(22) Filed: Jan. 24, 2023

(51) Int. Cl.
*G06F 21/55* (2013.01)
*H04L 9/08* (2006.01)

(52) U.S. Cl.
CPC .......... *H04L 9/0852* (2013.01); *H04L 9/0869* (2013.01)

(58) Field of Classification Search
CPC ............................ H04L 9/0852; H04L 9/0869
USPC .......................................................... 713/189
See application file for complete search history.

(56) References Cited

U.S. PATENT DOCUMENTS

| | | | | |
|---|---|---|---|---|
| 6,128,391 | A | * 10/2000 | Denno | H04L 9/3271 |
| | | | | 713/169 |
| 6,442,448 | B1 | * 8/2002 | Finley | H04L 63/062 |
| | | | | 700/231 |
| 10,326,803 | B1 | * 6/2019 | Haney | H04L 63/30 |
| 10,438,198 | B1 | 10/2019 | Griffin et al. | |
| 10,679,452 | B2 | * 6/2020 | Williams | G06Q 20/40 |

| | | | | |
|---|---|---|---|---|
| 11,080,699 | B1 | 8/2021 | Griffin et al. | |
| 11,212,090 | B1 | 12/2021 | Griffin et al. | |
| 2007/0130455 | A1 | * 6/2007 | Elliott | H04L 9/0858 |
| | | | | 713/150 |
| 2016/0242030 | A1 | * 8/2016 | Pang | H04L 9/002 |
| 2018/0331830 | A1 | * 11/2018 | Jerichow | H04W 12/35 |
| 2020/0396070 | A1 | * 12/2020 | Rubin | H04L 9/0825 |
| 2020/0403787 | A1 | * 12/2020 | Islam | H04L 9/0852 |
| 2021/0083865 | A1 | * 3/2021 | Obadia | H04L 9/0852 |

(Continued)

OTHER PUBLICATIONS

American National Standard for Financial Services, ANSI X9.24-3-2017, Retail Financial Services Symmetric Key Management, Part 3: Derived Unique Key Per Transaction, Accredited Standards Committee X9, Incorporated Financial Industry Standards, Date Approved: Oct. 11, 2017, preview, 9 pages.

(Continued)

*Primary Examiner* — Taghi T Arani

*Assistant Examiner* — Pegah Barzegar

(74) *Attorney, Agent, or Firm* — Foley & Lardner LLP

(57) ABSTRACT

The arrangements disclosed herein relate to systems, apparatus, methods, and non-transitory computer readable media for Quantum for DUKPT (Q-DUKPT), where an Initialization Key (IK) using a Quantum Random Number Generator (QRNG). An identifier for a device is generated by performing XOR on a Base Derivation Key (BDK) and the IK. The device derives a key for each transaction to encrypt original data using IK or a previous key. The host receives from the device the encrypted original, the identifier, and a counter that indicates a current number of transactions. The host runs the same derive function used by the device for a number of iterations equal to the current number of transactions with IK as the initial input, to derive the key used to by the device to encrypt the original data.

16 Claims, 5 Drawing Sheets

100

(56)            References Cited

U.S. PATENT DOCUMENTS

| | | | |
|---|---|---|---|
| 2023/0254132 A1* | 8/2023 | Ramanathan ......... | H04L 9/0869 |
| | | | 380/28 |
| 2024/0056438 A1* | 2/2024 | Bandy ................ | G06K 19/0723 |
| 2024/0073011 A1* | 2/2024 | Kunz ................... | H04L 9/0852 |

OTHER PUBLICATIONS

U.S. Appl. No. 17/379,509 as filed, entitled "Derived Unique Token Per Transaction," filed Jul. 19, 2021.
U.S. Appl. No. 17/562,699 as filed, entitled "Derived Unique Random Key Per Transaction," filed Dec. 27, 2021.

* cited by examiner

QUANTUM DERIVED UNIQUE KEY PER TRANSACTION

BACKGROUND

Derive Unique Key Per Transaction (DUKPT), defined in the American National Standards Institute (ANSI) standard X9.24-3 provides a method to enable a Transaction Processing Service (TPS) to receive cryptographically protected Personal Identification Numbers (PIN) from numerous terminals using a unique symmetric cryptographic key per transaction in an asynchronous manner but only managing one base key. DUKPT is implemented on millions of Point Of Sale (POS) terminals and Automated Teller Machines (ATM) worldwide. POS terminals are typically shipped from the manufacturer to the Key Injection Facility (KIF) were keys are injected, then shipped to the merchant site for deployment. The acquirer host receives payment (debit or credit) authorization requests from POS terminals with a customer encrypted Personal Identification Number (PIN).

SUMMARY

The arrangements disclosed herein relate to systems, methods, non-transitory computer-readable media, and apparatuses for determining, by a device, an Initialization Key (IK) based on a Quantum Random Number Generator (QRNG), deriving, by the device, first key for a first transaction using the IK, determining, by the device, encrypted first original data by encrypting first original data using the first key, and sending, by the device to a host, the encrypted first original data, an identifier of the device, and a counter identifying a current number of transactions.

The arrangements disclosed herein relate to systems, methods, non-transitory computer-readable media, and apparatuses for receiving, by a host from a device, encrypted first original data for a first transaction, an identifier of the device, and a counter identifying a current number of transactions, determining, by the host, an IK by performing XOR on a Base Derivation Key (BDK) and the identifier, deriving, by the host, a first key for the first transaction using the IK and the counter, and decrypting, by the host, the encrypted first original data using the first key.

The arrangements disclosed herein relate to systems, methods, non-transitory computer-readable media, and apparatuses for determining, a KIF, an IK using a QRNG, determining, by the KIF, an identifier of a device by performing XOR on the IK and a BDK, and installing, by the KIF, the identifier to the device.

These and other features, together with the organization and manner of operation thereof, will become apparent from the following detailed description when taken in conjunction with the accompanying drawings.

DETAILED DESCRIPTION

Figure 1:
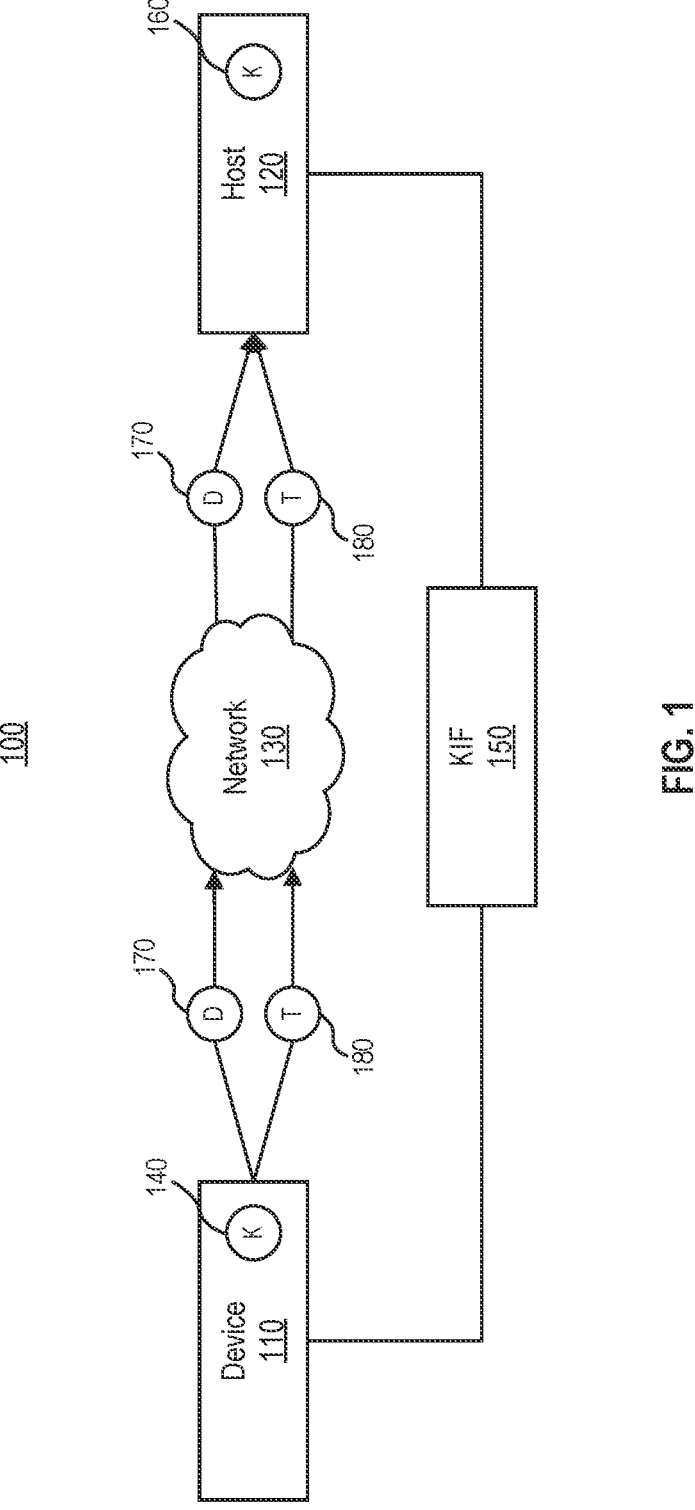
FIG. 1 is a block diagram of a system for generating cryptographic keys between a device and a host, according to some arrangements.

DUKPT uses a transaction counter with a maximum limit and various one-way functions to derive keys, which are used to encrypt a PIN at the point of entry. The encrypted data, the transaction counter, and the Terminal Identifier (TID) are sent to the host system. The host is able to re-derive the terminal initial key and then re-derive the cryptographic key using the transaction counter and the initial key. Once the initial key has been injected into the terminal and the terminal has been deployed, initial key replacement is problematic. Older terminals were decommissioned when the transaction counter maximized, or replacement initial keys might be loaded using manual procedures or newer methods including asymmetric (public key cryptography) key exchange.

Referring generally to the FIGS., apparatuses, systems, methods, and non-transitory computer-readable media described herein relate to quantum for DUKPT (Q-DUKPT), implementing a Quantum Random Number Generator (QRNG) that allows two or more parties such as a Point Of Sale (POS) terminal and a Key Injection Facility (KIF) to establish random numbers using quantum material or quantum entangled material. For example, a QRNG is used to establish a random number, designated as the Initialization Key (IK) between the POS terminal and the KIF. An exclusive-or (XOR) function is used to create the TID by the KIF and to recover the IK by the host. The KIF generates the TID and installs the TID into the POS terminal.

In some arrangements, an initial key generated using the Q-DUKPT method is used once to derive the first key per transaction unique to that transaction. The same original data encrypted with a different key will yield a different cryptogram. The original data can be communicated between a device and a host, with the key derived using the Q-DUKPT method used to encrypt and decrypt the original data. In some arrangements, the host stores only the Base Derivation Key (BDK) from which other keys are derived, while other derived keys can be deleted after being used.

Arrangements described herein enable a device (e.g., a transaction origination service) to receive cryptographically protected data (e.g., encryption, MAC, HMAC, etc.) from numerous terminals using a unique symmetric cryptographic key per device and per transaction. Furthermore, each terminal only contains symmetric keys that have not yet been used such that the physical compromise of one terminal does not affect other terminals, the device, or previous transactions from the compromised terminal. Arrangements described herein do not employ asymmetric cryptography, therefore the methods described herein are Post Quantum Cryptography (PQC) ready. Arrangements described herein allow deriving of an unlimited number of random keys chosen from a very large key space like an Advanced Encryption Standard (AES) 256-bit space. Arrangements described herein also support any symmetric algorithm (e.g., the AES algorithm). Additionally, the arrangements described herein do not require rekeying or decommissioning because new, random keys are continuously generated.

Arrangements described herein provide for generation of unpredictable keys, thus providing more security than a traditional DUKPT model. Accordingly, the arrangements described herein provide for more secure key generation than traditional DUKPT models by incorporating random numbers generated by the QRNG in the key generation process.

Conventional DUKPT mechanisms require the physical injection of the IK either as cleartext over a managed cable or encrypted using public key cryptography. The present arrangements avoids physical key injection of the IK and instead transfers the TID, a totally benign value, entered either locally or remotely into the POS terminal. Conventional DUKPT mechanisms uses TID with the BDK to derive the IK. The present arrangements enables quantum DUKPT with the same relationship without increased risk while providing a strong random IK versus the derived IK from the secret BDK and the semi-public TID.

A symmetric key refers to a cryptographic key that is identical for the sender and receiver of a data transmission. Both the sender and receiver must have the same key (e.g., the symmetric key) for the data to be transmitted to the receiver such that the receiver can either decipher the encrypted data or verify an Integrity Check Value (ICV) based on a Hash-based Message Authentication Code (HMAC) or a message authentication code (MAC).

FIG. 1 is a block diagram of a system 100 for generating cryptographic keys between a device 110 and a host 120, according to some arrangements. The system 100 includes at least the device 110, the host 120, and the KIF 150. Each of the device 110, the host 120, and the KIF 150 is a computing system having processing, storage, and networking capabilities for generating, communicating, and/or verifying keys (e.g., a key 140). In some arrangements, the device 110 can be a terminal (e.g., a payment processor, a bank, etc.), an Internet connected computing device (e.g., a computer, smartphone, etc.), an Internet of Things (IoT) connected device (e.g., a digital assistant, a thermostat, a vehicle, etc.), and Internet connected device that has a network address (e.g., a computer, smartphone, etc.).

The device 110 can derive the key 140, encrypt original data with the key 140, and send encrypted original data (D) 170 and at least one parameter (T) 180 to the host 120 via the network 130. The key 140 is a Q-DUKPT in the manner described herein. The key 140 is a symmetric key and can be derived from the IK, which is generated by a QRNG. For example, the IK can be an unpredictable quantum-safe IK. The key 140 and is used to protect the encrypted original data 170 communicated between the device 110 and the host 120. The key 140 is unique per transaction. In some examples, the at least one parameter 180 includes a TID of the device 110 and a counter. In some examples, the device 110 destroys the IK after the IK is used to derive a first key, and destroys the previous key used to derive the current key after the current key is generated. In some examples, the host 120 destroys the IK, the previous keys derived based on the IK and the counter, and the current key after the current key is used, maintaining only the BDK. In some examples, the host 102 can use the same BDK for multiple devices such as the device 110. Accordingly, the host 102 can use the same BDK to manage encryption and decryption for multiple devices.

The original data can be any type of information. Examples of original data can include a personal identification number (PIN), a primary account number (PAN) which is the payment card number (e.g., a credit card number, a debit card number, and the like), a financial account number, a password, social security number, a name, an address, an email address, or any Personally Identifiable Information (PII) or Protected Health Information (PHI). In some examples, the original data can be a security object (e.g., a token, a certificate, and the like). In some examples, the original data can be a seed for key-generation (e.g., for generating a One-Time-Password (OTP)). The original data refers to any information that needs protection during transmission and storage.

The device 110 is a device that can initiate transactions for which keys (e.g., the key 140) need to be generated to protect the original data associated with those transactions. Examples of the device 110 include, but are not limited to, a mobile device, a smartphone, a laptop computer, a tablet, a desktop computer, a POS device, an ATM, and the like. In some arrangements, the same original data (e.g., a payment number, PIN, etc.) can be associated with multiple transactions. For example, payment transactions in different instances using the same payment card number can be initiated via the device 110. Other types of transactions (such as, but not limited to, exchange security objects) can be likewise implemented. A user (e.g., a customer, a merchant, and the like) can initiate the transaction by providing user input corresponding to the original data. In some arrangements, the device 110 does not store the original data or used keys. In some arrangements, the device 110 stores a local copy of the original data. In some examples, the device 110 can derive the keys (e.g., the key 140) on an ad hoc basis, responsive to each transaction. In some examples, the device 110 can derive the keys (e.g., the key 140) in batch and store only the keys that have yet to be used while deleting used keys.

The host 120 is a computing system that can receive the encrypted original data 170 and the at least one parameter 180 from the device 110 and derive a key 160. The key 160 allows the host 120 to decrypt the encrypted original data 170. In some arrangements, the host 120 does not store any keys (including the key 160) aside from a Base Derivation Key (BDK) from which other keys (e.g., the key 160) can be derived. The host 120 can derive the keys (e.g., the key 160) on an ad hoc basis, responsive to each transaction. In other words, the host 120 can function as a TPS without any key storage. For example, the host 120 can be a computing system of a financial institution that issues a bank card (e.g., a credit card, a debit card, and the like) to the user of the device 110. The host 120 can authenticate or approve transactions initiated by the user operating the device 110 by verifying the original data corresponding to those respective transactions.

The KIF 150 is a computing system that can use a QRNG to generate the IK, and generating a TID (e.g., a serial number, etc.) for the device 110 by XORing the IK and the BDK. The TID is loaded into the device 110.

The network 130 is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 130 is structured to permit the exchange of data, values, instructions, messages, and the like.

Figures 2A, 2B, 2C:
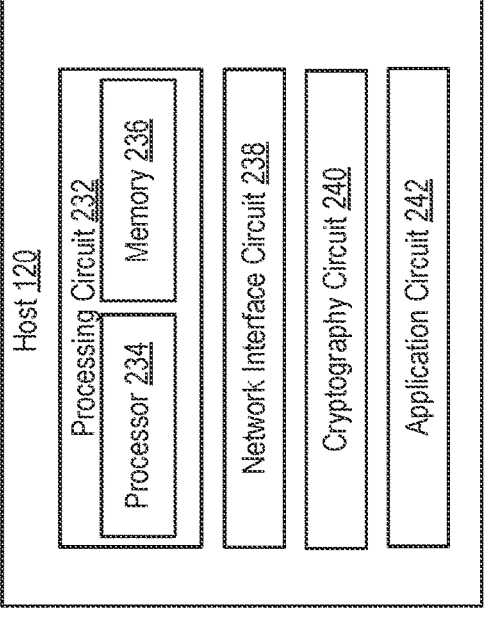
FIG. 2A is a block diagram of an example of the device of the system set forth in FIG. 1, according to some arrangements.
FIG. 2B is a block diagram of an example of the host of the system set forth in FIG. 1, according to some arrangements.
FIG. 2C is a block diagram of an example of the KIF set forth in FIG. 1, according to some arrangements.

FIG. 2A is a block diagram of an example of the device 110 of the system 100 set forth in FIG. 1, according to some arrangements. Referring to FIGS. 1-2A, the device 110 is shown to include various circuits and logic for implementing the operations described herein. More particularly, the device 110 includes one or more of a processing circuit 212, a network interface circuit 218, a cryptography circuit 220, an application circuit 222, and an input/output circuit 224. While various circuits, interfaces, and logic with particular functionality are shown, it should be understood that the device 110 includes any number of circuits, interfaces, and logic for facilitating the operations described herein. For example, the activities of multiple circuits are combined as a single circuit and implemented on a same processing circuit (e.g., the processing circuit 212), as additional circuits with additional functionality are included.

In some arrangements, the processing circuit 212 includes a processor 214 and a memory 216. The processor 214 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 216 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 216 is or includes tangible, non-transient volatile memory or non-volatile memory. Accordingly, the memory 216 includes database components, object code components, script components, or any other type of information structure for supporting the various activities and information structures described herein. The processing circuit 212 can be used to implemented one or more of the circuits 218, 220, 222, and 224.

The network interface circuit 218 is configured for and structured to establish a connection and communicate with host 120 and/or the KIF 150 via the network 150 or another suitable wired, wireless, or physical connection. The network interface circuit 218 is structured for sending and receiving data over a communication network (e.g., the network 150) or a physical connection (e.g., via a physical connector such as Universal Serial Bus (USB)). Accordingly, the network interface circuit 218 includes any of a cellular transceiver (for cellular standards), wireless network transceiver (for 802.11X, ZigBee, Bluetooth, Wi-Fi, or the like), wired network interface, or a combination thereof. For example, the network interface circuit 218 may include wireless or wired network modems, ports, baseband processors, and associated software and firmware.

The application circuit 222 can be used to execute one or more applications or software on the device 110 for which data needs to be accessed by the host 120. For example, the application circuit 222 can execute one or more applications that generate the original data to be accessed by the host 120. For example, the application circuit 222 can execute a mobile banking application, a browser, a word processing application, a mobile banking application, a mobile wallet, and so on.

The input/output circuit 224 is configured to receive user input from and provide information to the user. In this regard, the input/output circuit 224 is structured to exchange data, communications, instructions, etc. with an input/output component of the device 110. For example, the input/output circuit 224 can include an input device for receiving the original data from the user operating the device 110. Accordingly, in some arrangements, the input/output circuit 224 includes an input/output device such as a display device, touchscreen, keyboard, microphone, and/or the like. In arrangements in which the device 110 is a POS device or an ATM, the input/output circuit 205 can include one or more of a payment card reader, a barcode reader, a Bluetooth device, a Near Field Communication (NFC) reader, and the like for receiving information from a customer. In some arrangements, the input/output circuit 205 includes communication circuitry for facilitating the exchange of data, values, messages, and the like between the input/output device and the components of the device 110. In some arrangements, the input/output circuit 205 includes machine-readable media for facilitating the exchange of information between the input/output device and the components of the device 110. In still another arrangement, the input/output circuit 205 includes any combination of hardware components (e.g., a touchscreen), communication circuitry, and machine-readable media.

The cryptography circuit 220 is executed by the processing circuit 212 in some arrangements. The cryptography circuit 220 can perform cryptographic operations such as derive keys (e.g., the key 140), encrypting the original data using the derived keys, and decrypting data using the derived keys, in the manner described. The device 110 can provide the cryptography circuit 220 in various manners. In some arrangements, the cryptography circuit 220 is a server-based application executable on the device 110. In this regard, the user of the device 110 has to download the cryptography circuit 220 from an application download server prior to usage. In some arrangements, the cryptography circuit 220 is a web-based interface application provided by an application server. In some arrangements, the cryptography circuit 220 includes an API and/or an SDK provided by the application server that facilitates integration with other applications. In some arrangements, the cryptography circuit 220 is coded into the memory 216 of the device 110. All such variations and combinations are intended to fall within the spirit and scope of the present disclosure.

The cryptography circuit 220 includes a QRNG 221. The QRNG 221 can generate a stream of quantum entangled particles, such as photons containing information such as a string of binary zeroes and ones. The stream of quantum entangled particles correspond to the IK used as the basis for deriving a key used to encrypt or decrypt data. Although shown to reside in the device 110 and the KIF 150 separately, the QRNG 221 and the QRNG 261 can be a single Quantum Key Distribution (QKD) device that resides on the device 110, the KIF 150, a third party system, or a combination of two or more thereof.

FIG. 2B is a block diagram of an example of the host 120 of the system 100 set forth in FIG. 1, according to some arrangements. Referring to FIGS. 1-2B, the host 120 is shown to include various circuits and logic for implementing the operations described herein. More particularly, the host 120 includes one or more of a processing circuit 232, a network interface circuit 238, a cryptography circuit 240, and an application circuit 242. While various circuits, interfaces, and logic with particular functionality are shown, it should be understood that the host 120 includes any number of circuits, interfaces, and logic for facilitating the operations described herein. For example, the activities of multiple circuits are combined as a single circuit and implemented on a same processing circuit (e.g., the processing circuit 232), as additional circuits with additional functionality are included.

In some arrangements, the processing circuit 232 has a processor 234 and memory 236. The processor 234 is a processing component such as the processor 214. The memory 236 is a memory device such as the memory 216. The processing circuit 232 can be used to implemented one or more of the circuits 238, 240, and 242. In some arrangements, the memory 236 stores various unused keys derived in the manner described, such as the key 140.

The network interface circuit 238 is a network device such as the network interface circuit 218. The network interface circuit 238 is configured for and structured to establish a connection and communicate with the device 110 and/or the KIF 150 via the network 150 or another suitable wired, wireless, or physical connection.

The cryptography circuit 240 can be implemented with the processing circuit 232 or a separate processing circuit similar to the processing circuit 232. In some arrangements, the cryptography circuit 240 can derive keys, decrypt encrypted original data received from the device 110 using the derived keys, encrypt data using the derived keys, in the manner described. In some arrangements, the cryptography circuit 240 provides key generation functionalities to the host 120. Illustrating with a non-limiting example, the cryptography circuit 240 provides a host-based application to be downloaded by the host 120. For example, the cryptography circuit 240 provides a web-based application to be accessed by the host 120 or coded into the memory 236 of the host 120. The cryptography circuit 240 includes an API and/or an SDK facilitates integration with other applications. All such variations and combinations are intended to fall within the spirit and scope of the present disclosure.

The application circuit 242 can be used to execute one or more applications or software on the host 120 for which original data of the device 110 needs to be accessed or obtained. For example, the application circuit 242 can execute one or more applications that use verified original data of the device 110 as input to generate an output or a decision. For example, the application circuit 242 can execute a server application for a mobile banking platform, a browser, a word processing, a mobile banking platform, a mobile wallet platform, and so on. In some examples, the application circuit 242 includes or is coupled to an original data database that stores the original data. In some arrangements, the original data database stores relationships (e.g., in a lookup table) between the original data and unique identification. The unique identification can be used to identify corresponding original data. The application circuit 242 can obtain the original data by decrypting the encrypted data received from the device 110 and compare the original data with the original data stored in the original data database for identification and/or authentication purposes.

FIG. 2C is a block diagram of an example of the KIF 150 set forth in system 100 of FIG. 1, according to some arrangements. Referring to FIGS. 1-2C, the KIF 150 is shown to include various circuits and logic for implementing operations described herein. More particularly, the KIF 150 includes one or more of a processing circuit 252, a network interface 258, and a cryptography circuit 260. While various circuits, interfaces, and logic with particular functionality are shown, it should be understood that the KIF 150 includes any number of circuits, interfaces, and logic for facilitating the operations described herein. For example, the activities of multiple circuits are combined as a single circuit and implemented on a same processing circuit (e.g., the processing circuit 252), as additional circuits with additional functionality are included.

In some arrangements, the processing circuit 252 has a processor 254 and memory 256. The processor 254 is a processing component such as the processor 214. The memory 256 is a memory device such as the memory 216. The processing circuit 252 can be used to implemented one or more of the circuits 258 and 260.

The network interface circuit 258 is a network device such as the network interface circuit 218. The network interface circuit 258 is configured for and structured to establish a connection and communicate with the device 110 and/or the host 120 via the network 150 or another suitable wired, wireless, or physical connection.

The cryptography circuit 260 is executed by the processing circuit 252 in some arrangements. The cryptography circuit 260 can generate an IK, generate the TID based on the IK and the BDK, provide the TID to the device 110. The cryptography circuit 260 includes a QRNG 261. The QRNG 261 can generate a stream of quantum entangled particles, such as photons containing information such as a string of binary zeroes and ones. The stream of quantum entangled particles correspond to the IK used as the basis for deriving a key used to encrypt or decrypt data. As noted herein, the QRNG 221 and the QRNG 261 can be a single QKD device (e.g., the QKD device 300 in FIG. 3) that resides on the device 110, the KIF 150, a third party system, or a combination of two or more thereof.

Figure 3:
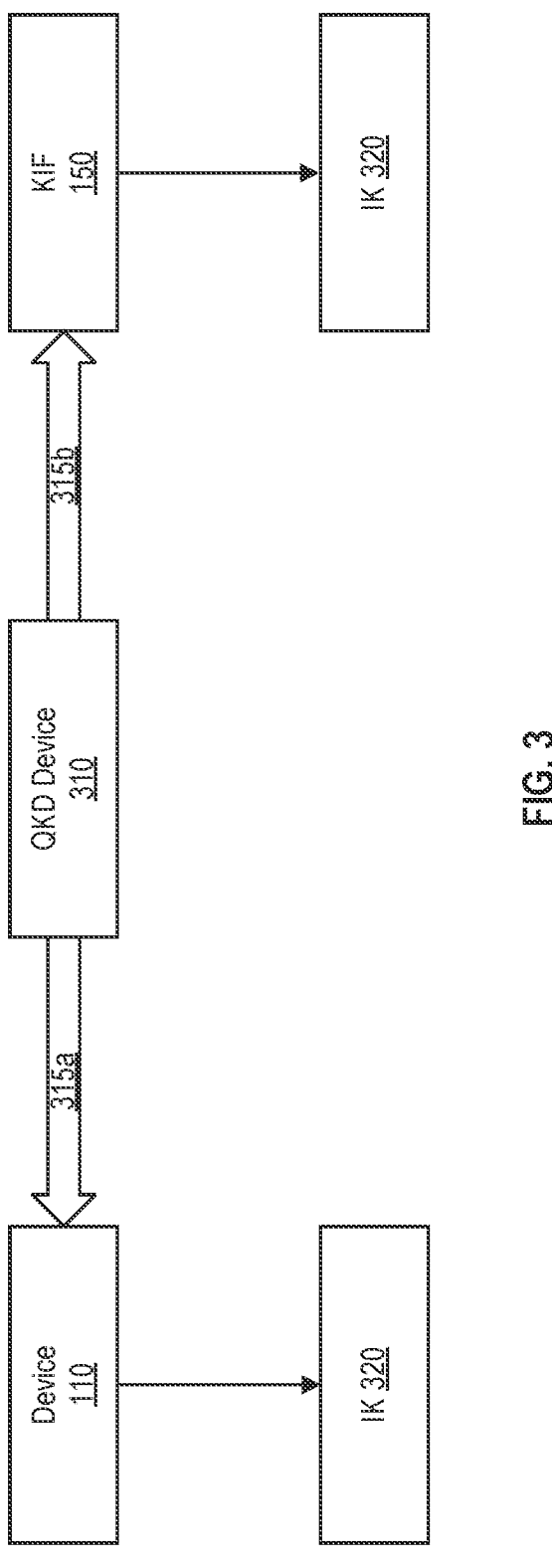
FIG. 3 is a schematic block diagram illustrating a QKD method, according to some arrangements.

FIG. 3 is a schematic block diagram illustrating a QKD method 300, according to some arrangements. QKD is mechanism by which keys (e.g., the IK 320) are established between two communicating parties, such as the device 110 and the KIF 150. Example QKD protocols include the BB84 protocol and the E91 protocol. A QKD device 310 (represented by the QRNGs 221 and 261) generates two steams of quantum entangled particles 315a and 315b (e.g. photons containing information such as a string of binary zeroes and ones) and sends one stream to device 110 and another to KIF 150. QRNGs 221 and 261 are a true RNG that provides a quantum-safe IK 320 that is unpredictable. Accordingly, each stream of the quantum entangled particles 315a and 315b includes random bits. In some examples, one of the participants (e.g., the device 110 or the KIF 150) manages the QKD device 310. In some examples, a third party other than the participants manages the QKD device 310. The device 110 and KIF 150 both read the entangled particles 315a and 315b, interpreting the same string of binary zeroes and ones and converting the same into a cryptographic key (e.g., the IK 320) using a Key Derivation Function (KDF). The device 110 and the KIF 150 can use a separate communication channel to statically verify that the device 110 and the KIF 150 have read and interpreted the entangled particle correctly, e.g., the IKs 320 read by the device 110 and the KIF 150 are the same.

The device 110 reading the entangled particles 315a before the KIF 150 reading the entangled participles 315b destroys the entanglement given that although the KIF 150 reads the same information, the entangled particles 315b are affected by the reading of the entangled particles 315a by the device 110. Thus, if another attempt is made by device 110, KIF 150, or an attacker to re-read the same stream, the affected particles become no longer entangled, resulting in a different interpretation. Further, an attacker reading a stream before the device 110 breaks the entanglement such that when the device 110 reads the stream, the reading of the device 110 affects the particles, and the KIF 150 will obtain an invalid interpretation. An attacker reading the stream after the device 110 reads the stream also affects the detangled particles, and the KIF 150 will obtain an invalid interpretation. QKD allows an attacker to be detected such that the device 110 and the KIF 150 has knowledge of the attack by detecting invalid interpretation, thus refraining from using the stream to establish a cryptographic key.

Figure 4:
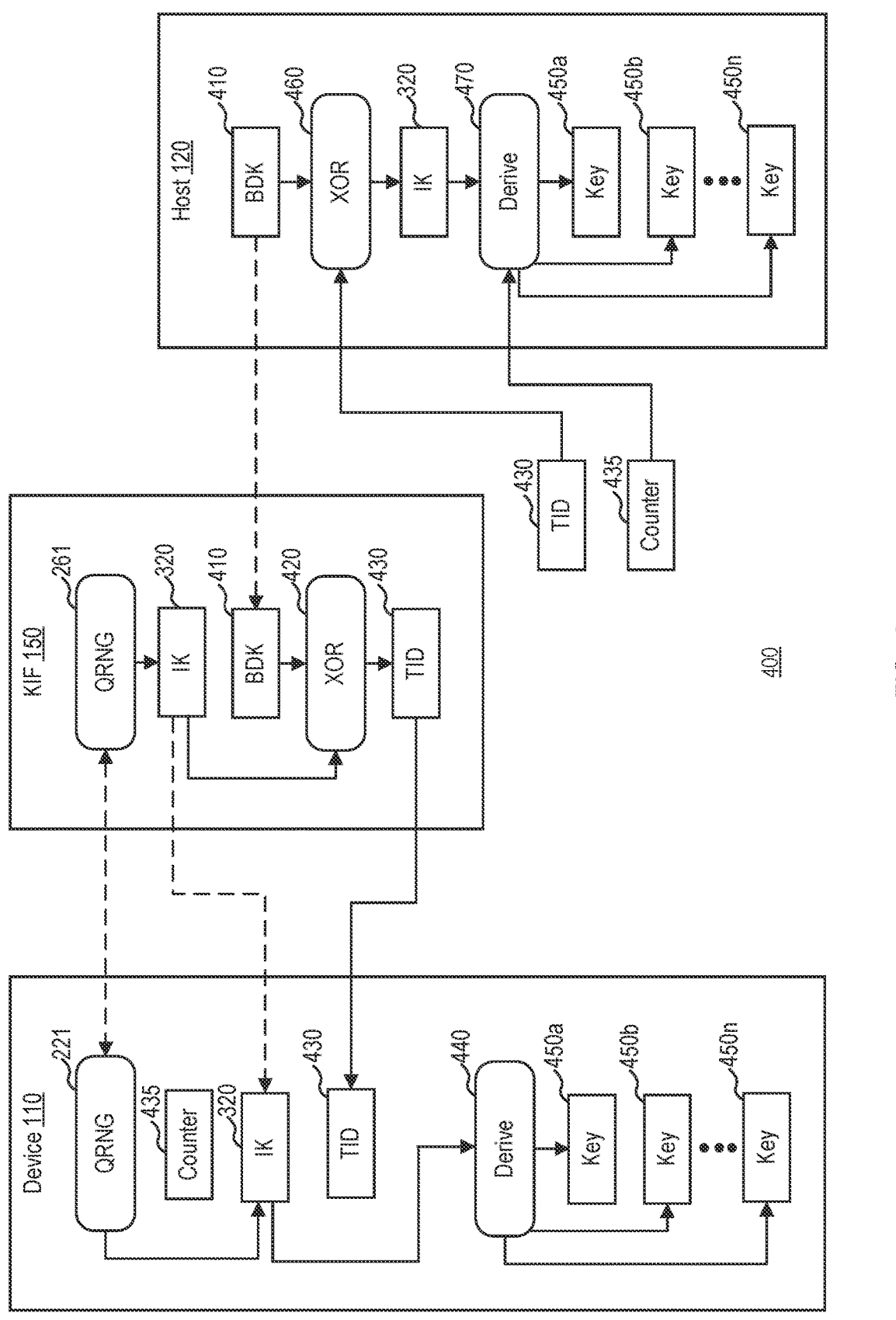
FIG. 4 is a flow diagram illustrating a method for generating cryptographic keys and encrypting and decrypting original data, according to various arrangements.
Figure 5:
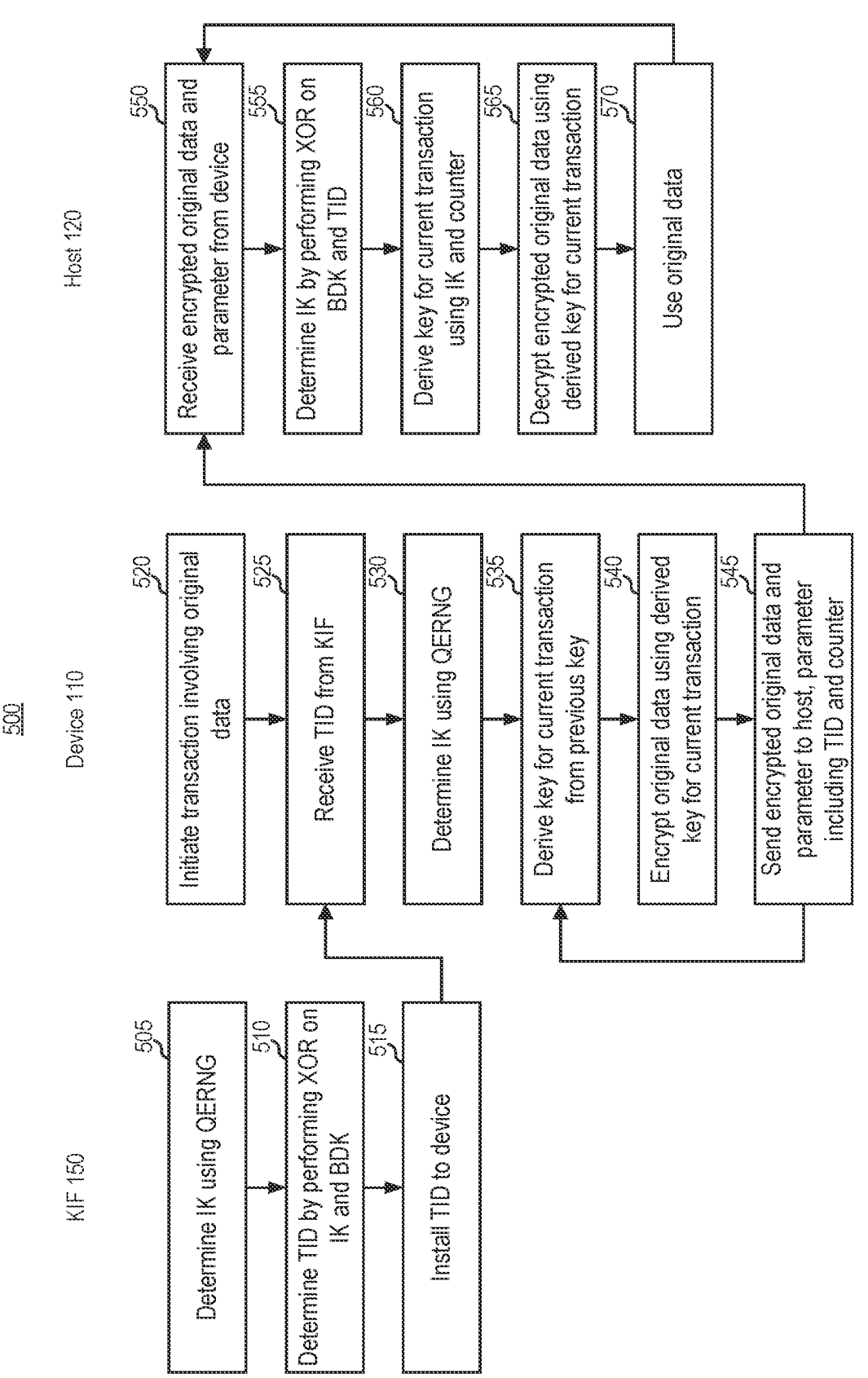
FIG. 5 is a flow diagram illustrating a method for generating cryptographic keys and encrypting and decrypting original data, according to various arrangements.

FIG. 4 is a flow diagram illustrating a method 400 for generating cryptographic keys and encrypting and decrypting original data, according to various arrangements. FIG. 5 is a flow diagram illustrating a method 500 for generating cryptographic keys and encrypting and decrypting original data, according to various arrangements. The method 400 can be a particular implementation of the method 500. The methods 400 and 500 can be performed by the system 100, e.g., the device 110, the host 120, and the KIF 150. The KIF 150 performs blocks 505, 510, and 515. The device 110 performs blocks 520, 525, 530, 535, 540, and 545. The host 120 performs blocks 550, 555, 560, 565, and 570. In general, the methods 400 and 500 illustrate an example of generating cryptographic keys (e.g., one or more of the keys 450a, 450b, . . . , 450n) and transmitting original data protected by the cryptographic keys. Each of the keys is unique to a transaction involving the original data.

At 505, the KIF 150 determines the IK 320 using the QRNG 261. The KIF 150 uses the QRNG 261 (e.g., the QKD device 310) to establish the IK 320 in the manner described with reference to at least FIG. 3. The IK 320 is unique to the device 110 given that QRNG is a true RNG that provides a quantum-safe IK 320 that is unpredictable.

At 510, the KIF 150 determines an identifier (e.g., the TID 430) by performing XOR 420 on IK 320 and BDK 410. The TID 430 is unique to the device 110. An example of the TID 430 includes a logical character string. In some examples, the KIF 150 (e.g., the cryptography circuit 260) can generate the BDK 410 and pass the BDK 410 to the host 120 via the network 130. In some examples, the host 120 (e.g., the cryptography circuit 240) can generate the BDK 410 and pass the BDK 410 to the KIF 150 via the network 130. Examples of the BDK 410 includes 2K-3DES, 3K-DES keys, AES keys, and so on. The XOR operation 420 can be a bitwise XOR operation.

At 515, the KIF 150 installs (e.g., injects, sends, and so on) the TID 430 to the device 110. For example, the KIF 150 can send the TID 430 via the network 130, a Transport Layer Security (TLS) encrypted tunnel, physical connection or cable, public key encryption, and so on. Instead of injecting the IK 320 into the device 110, the KIF 150 transfers the TID 430, a benign value, to the device 110, thus improving security.

The KIF 150 can repeat blocks 505, 510, and 515 for a batch of devices, each of which can be a device such as the device 110. The KIF 150 can provide a unique TID to each of the batch of devices. In some examples as noted herein, the KIF 150 can also provide the IK to each of the batch of devices, instead each device deriving its own IK.

At 520, the device 110 initiates a transaction involving the original data. The original data that needs to be cryptographically protected by a cryptographic key. For example, the application circuit 222 can execute an authentication and/or identification operation in which the original data to be cryptographically protected includes information that can authentication and/or identify a user. In other examples, application circuit 222 can execute any other suitable application for which the original data needs to be transferred to the host 120. At 525, the device 110 receives the TID 430 from the KIF 150 and stored the TID 430 in the memory 216. The TID 430 can be received before the transaction is initiated at 520.

At 530, the device 110 determines the IK 320 using the QRNG 221. The device 110 uses the QRNG 221 (e.g., the QKD device 310) to establish the IK 320 in the manner described with reference to at least FIG. 3.

Alternatively, instead of the device 110 determining the IK 320, the KIF 150 can install (e.g., inject, send, and so on) the generated IK 320 to the device 110. For example, the KIF 150 can send the IK 320 via the network 130, a TLS encrypted tunnel, physical connection or cable, public key encryption, and so on. In such arrangements, the GERNG 221 in the device 110 can be omitted.

At 535, the device 110 derives a key for a current transaction from a previous key. For the first transaction, the previous key is the IK 320, which is used only once to generate the first key (e.g., key 450a). For the second transaction, the previous key is the first key, which is used to generate the second key (e.g., the key 450n). For the nth transaction, the previous key is the (n−1)th key, which is used to generate the nth key (e.g., key 450n). The device 110 (e.g., the cryptographic circuit 220) includes counter 435 is used to count a current number of transactions N for which a cryptographic key is derived based on the IK in the manner described. For the first transaction, N=1, for the second transaction, N=2, . . . , for the nth transaction, N=n. Each value of N corresponds to a different one of the keys 450a, 450b, . . . , 450n.

In some arrangements, the derive function 440 includes a hash function such as SHA-256, SHA-512, and so on. The derive function 440 can be iterated multiple times in the manner described. Other examples of the derive function 440 can be likewise implemented.

The previous key for the immediately previous transaction is applied as the input to the derive function 440 which outputs the current key for the current transaction. For example, for the first transaction for which the previous key is IK 320, IK 320 is applied as the input to the derive function 440 to generate the key 450a. After the key 450a is generated, IK 320 is deleted for security reasons. For the second transaction for which the key 450b is the previous key, the key 450a is applied as input to the derive function 440 to generate the key 450b. For the nth transaction, the previous key is the (n−1)th key, which is applied as input to the derive function 440 to generate the key 450n. In some examples, in response to generating a current key, the previous key used to generate the current key is destroyed, deleted, or erased by the device 110 for security reasons.

At 540, the device 110 encrypts the original data using the derived key for the current transaction, to obtain the encrypted original data 170. At 545, the device 110 sends, via the network 130, the encrypted original data 170 and the at least one parameter 180 to the host 120. The at least one parameter 180 includes the TID 430 and the counter 435. For the first transaction, the cryptography circuit 220 encrypts first original data using the key 450a to obtain the first encrypted original data, which is transmitted along with the TID 430 and the counter 435 (N=1) to the host 120 via the network 130. For the second transaction, the cryptography circuit 220 encrypts second original data using the key 450b to obtain the second encrypted original data, which is transmitted along with the TID 430 and the counter 435 (N=2) to the host 120 via the network 130. For the nth transaction, the cryptography circuit 220 encrypts nth original data using the key 450n to obtain the nth encrypted original data, which is transmitted along with the TID 430 and the counter 435 (N=n) to the host 120 via the network 130. In some examples, in response to encrypting the original data using a first key, that first key is used to generated the next key for a subsequent transaction, and the first key is destroyed, deleted, or erased after generating the next key. The next key is stored unlike new original data needs to be encrypted.

The method 500 can return to block 535 for the device 110 for a subsequent transaction. For example, at 535, for a next transaction which is now the current transaction, another key is derived from the previous key generated by the derive function 440 in the previous transaction. At 540, another original data, which can be the same or different from the original data from previous iteration(s), can be encrypted using the derived key for the current transaction. At 545, the encrypted original data and the at least one parameter (including the TID 430 and the updated counter 435), is sent to the host 120.

At 550, for the host 120 receives, via the network 130, the encrypted original data 170 and the at least one parameter 180 (including the TID 403 and the counter 435) from the device 110. At 555, the host 120 determines the IK 320 by performing XOR 460 on the BDK 410 and the TID 430. That is, the host 120 first recovers the IK 320 in response to receiving the encrypted original data 170 and the at least one parameter 180. The XOR 460 is the same function as the XOR 420, e.g., a bitwise XOR. Accordingly, the host 120 does not need to store a copy of the IK 320 for the device 110, and can instead derive the IK 320 ad hoc for each transaction, therefore improving security. The host 120 can stored the BDK 410 in the memory 236.

At 560, the host 120 derives the key for the current transaction using the IK 320 and the counter 435. At 565, the host 120 decrypts the encrypted original data using the derived key for the current transaction. For example, the host 120 can run the derive function 470 for a number of times N indicated by the counter 435, with IK 320 as the initial input. IK 320 is applied as input to the derive function 470 to obtain a result, which is applied as input to the derive function 470, and so on, until the derive function 470 is run N times. In other words, the output of the derive function 470 is applied as the input of the derive function N−1 times. In some arrangements, the derive function 470 can be the same as the derive function 440 and can include a hash function. The derive function 470 can be iterated multiple (e.g., N) times in the manner described. Other examples of the derive function 470 can be likewise implemented.

For example, for the first transaction (N=1 as indicated by the counter 435), IK 320 is applied as the input to the derive function 470 to generate the key 450*a*, which is the same key used by the device 110 to encrypt first original data. For the second transaction (N=2 as indicated by the counter 435), IK 320 is applied as the input to the derive function 470 to generate the key 450*a*, which is again applied as input to the derive function 470 to generate the key 450*b*, which is the same key used by the device 110 to encrypt second original data. For the nth transaction (N=n as indicated by the counter 435), IK 320 is applied as the input to the derive function 470 to generate the key 450*a*, which is again applied as input to the derive function 470 to generate the key 450*b*, . . . , key 450*n*-1 is applied as input to the derive function 470 to generate the key 450*n*, which is the same key used by the device 110 to encrypt nth original data. The counter 435 allows the device 110 and the host 120 to synchronize the key used to encrypt the original data. In some examples, the host 120 destroys the IK 320, the previous keys derived based on the IK 320 and the counter

435, and the current key after the current key is used, maintaining only the BDK 410. In some examples, the host 102 can use the same BDK 410 for multiple devices such as the device 110. Accordingly, the host 102 can use the same BDK 410 to manage encryption and decryption for multiple devices.

At 570, the host 120 uses the original data. For example, the application circuit 242 of the host 120 can execute one or more applications that identifies or authenticates a user using the original data. Upon identification and/or authentication, the application can generate an output or a decision.

The method 500 can return to block 550 for the host 120 for a subsequent transaction. For example, at 550, for a next transaction which is now the current transaction, the host 120 receives the encrypted original data 170 and the at least one parameter 180 (including the TID 430 and the updated counter 435) from the device 110. At 555, the host 120 re-derives the IK 320 by performing the XOR 460 on the BDK 410 and the TID 430. At 560, the host 120 derives the key for the current transaction using the IK 320 and the counter 435. At 565, the host 120 decrypts the encrypted original data 170 using the derived key for the current transaction. At 570, the host 120 uses the original data.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

determining, by a device, an Initialization Key (IK) based on a Quantum Random Number Generator (QRNG);

receiving, by the device from a Key Injection Facility (KIF), an identifier of the device, wherein the identifier is determined by the KIF by performing XOR on the IK and a Base Derivation Key (BDK);

deriving, by the device, first key for a first transaction by applying the IK and a counter identifying a current number of transactions as inputs into a function, wherein the counter is distinct from the IK, wherein the function comprises a key derivation function;

determining, by the device, encrypted first original data by encrypting first original data using the first key, wherein the first original data comprises first information that needs protection during transmission or storage; and sending, by the device to a host, the encrypted first original data, the identifier of the device, and the counter, wherein the host determines the IK using the identifier, derives the first key by applying the IK and the counter as inputs into the function, and decrypts the encrypted first original data using the first key.

2. The method of claim 1, wherein determining the IK based on the QRNG comprises determining, by a first QRNG of the device, the IK.

3. The method of claim 1, wherein the KIF comprises the QRNG; and determining the IK based on the QRNG comprises receiving, by the device from the KIF, the IK generated by the QRNG of the KIF.

4. The method of claim 1, wherein deriving the first key for the first transaction using the IK comprises running, by the device, the IK through the function to generate the first key, wherein the function comprises a derive function.

5. The method of claim 1, comprising deriving, by the device, second key for a second transaction using a previous key, the previous key being the first key;

determining, by the device, encrypted second original data by encrypting second original data using the second key, wherein the second original data comprises second information that needs protection during transmission or storage; and sending, by the device to the host, the encrypted second original data, the identifier of the device, and the counter identifying the current number of transactions, wherein the current number of transactions is 2.

6. The method of claim 5, wherein deriving the second key for the second transaction using the previous key comprises running, by the device, the first key through the function to generate the second key.

7. A method, comprising:

receiving, by a host from a device, encrypted first original data for a first transaction, an identifier of the device, and a counter identifying a current number of transactions, wherein the device determines an Initialization Key (IK) based on a Quantum Random Number Generator (QRNG), the device derives a first key for the first transaction by applying the IK and the counter identifying the current number of transactions as inputs into a function, the device determines the encrypted first original data by encrypting first original data using the first key, wherein the first original data comprises first information that needs protection during transmission or storage, wherein the identifier is received by the device from a Key Injection Facility (KIF), wherein the identifier is determined by the KIF by performing XOR on the IK and a Base Derivation Key (BDK);

determining, by the host, the IK by performing XOR on the BDK and the identifier;

deriving, by the host, a first key for the first transaction using the IK and the counter, wherein the counter is distinct from the IK, wherein the function comprises a key derivation function; and decrypting, by the host, the encrypted first original data using the first key.

8. The method of claim 7, wherein deriving the first key for the first transaction using the IK and the counter comprises running, by the host, the IK through the function, wherein the function comprises a derive function.

9. The method of claim 7, comprising:

receiving, by the host from the device, encrypted second original data for a second transaction, the identifier of the device, and the counter identifying the current number of transactions, wherein the second original data comprises second information that needs protection during transmission or storage;

determining, by the host, the IK by performing the XOR on the BDK and the identifier;

deriving, by the host, a second key for the second transaction using the IK and the counter; and decrypting, by the host, the encrypted second original data using the second key.

10. The method of claim 9, wherein the device uses the function to generate the second key to encrypt second original data to generate the encrypted second original data;

deriving the second key for the second transaction using the IK and the counter comprises running, by the host, the function for a number of times equal to the current number of transactions indicated by the counter, with the IK as an initial input.

11. The method of claim 7, wherein the IK is generated by the device using the QRNG by the KIF which provides the IK to the device.

12. A method, comprising:

determining, a Key Injection Facility (KIF), an Initialization Key (IK) using a Quantum Entangled Random Number Generator (QRNG);

determining, by the KIF, an identifier of a device by performing XOR on the IK and a Base Derivation Key (BDK); and installing, by the KIF, the identifier to the device, comprising sending the identifier to the device, wherein the device derives a first key for a first transaction by applying the IK and a counter identifying a current number of transactions as inputs into a function, the device determines encrypted first original data by encrypting first original data using the first key, wherein the first original data comprises first information that needs protection during transmission or storage, the device sends to a host the encrypted first original data, the identifier of the device, and the counter, wherein the counter is distinct from the IK, wherein the function comprises a key derivation function, the host determines the IK using the identifier, derives the first key by applying the IK and the counter as inputs into the function, and decrypts the encrypted first original data using the first key.

13. The method of claim 12, comprising installing, by the KIF, the IK to the device.

14. The method of claim 12, wherein the device generates the IK.

15. The method of claim 12, wherein the device generates a plurality of keys using the IK, each of the plurality of keys encrypts original data for a corresponding one of a plurality of transactions, and the device sends the encrypted original data, the identifier, and the counter identifying the current number of transactions to the host for each of the plurality of transactions.

16. The method of claim 12, wherein the host derives the IK using the BDK and the identifier of the device.

* * * * *